INVENTOR
G.E. HENNING
BY
ATTORNEY

Feb. 7, 1950

G. E. HENNING
APPARATUS FOR ADVANCING AND
WORKING PLASTIC MATERIALS 2,496,625

Filed Nov. 13, 1946

INVENTOR
G.E. HENNING
BY [signature]
ATTORNEY

Patented Feb. 7, 1950

2,496,625

UNITED STATES PATENT OFFICE 2,496,625

APPARATUS FOR ADVANCING AND WORKING PLASTIC MATERIALS

George E. Henning, Baltimore, Md., assignor to Western Electric Company, Incorporated, New York, N. Y., a corporation of New York Application November 13, 1946, Serial No. 709,478

4 Claims. (Cl. 18—13)

This invention relates to apparatus for advancing and working plastic materials, and more particularly to extrusion screws for simultaneously forcing plastic material through extrusion apparatus and plasticizing the material.

In the manufacture of extruded products, such as insulated conductors, plastic material, such as thermoplastic compounds or compounds including rubber or synthetic rubber-like materials, sometimes are milled to thoroughly mix and plasticize the material so that it may be extruded properly. The material then is inserted into an extruder, which extrudes the material upon a conductor, while the material is in a plastic condition. Such working operations are relatively expensive and require considerable handling of the material. In the past, there has been no apparatus for reducing or substantially eliminating the necessity of the working operations prior to the insertion of the material into the extruder.

An object of the invention is to provide new and improved apparatus for advancing and working plastic material.

A further object of the invention is to provide new and improved extrusion screws for simultaneously forcing the plastic material through extrusion apparatus and plasticizing the material.

An apparatus illustrative of the invention includes an extrusion screw having a threaded portion for advancing plastic material along an extrusion cylinder, and also having a blade for kneading the plastic material to plasticize it.

A complete understanding of the invention may be obtained from the following detailed description of an apparatus forming a specific embodiment thereof, when read in conjunction with the appended drawings, in which.

Figure 1:
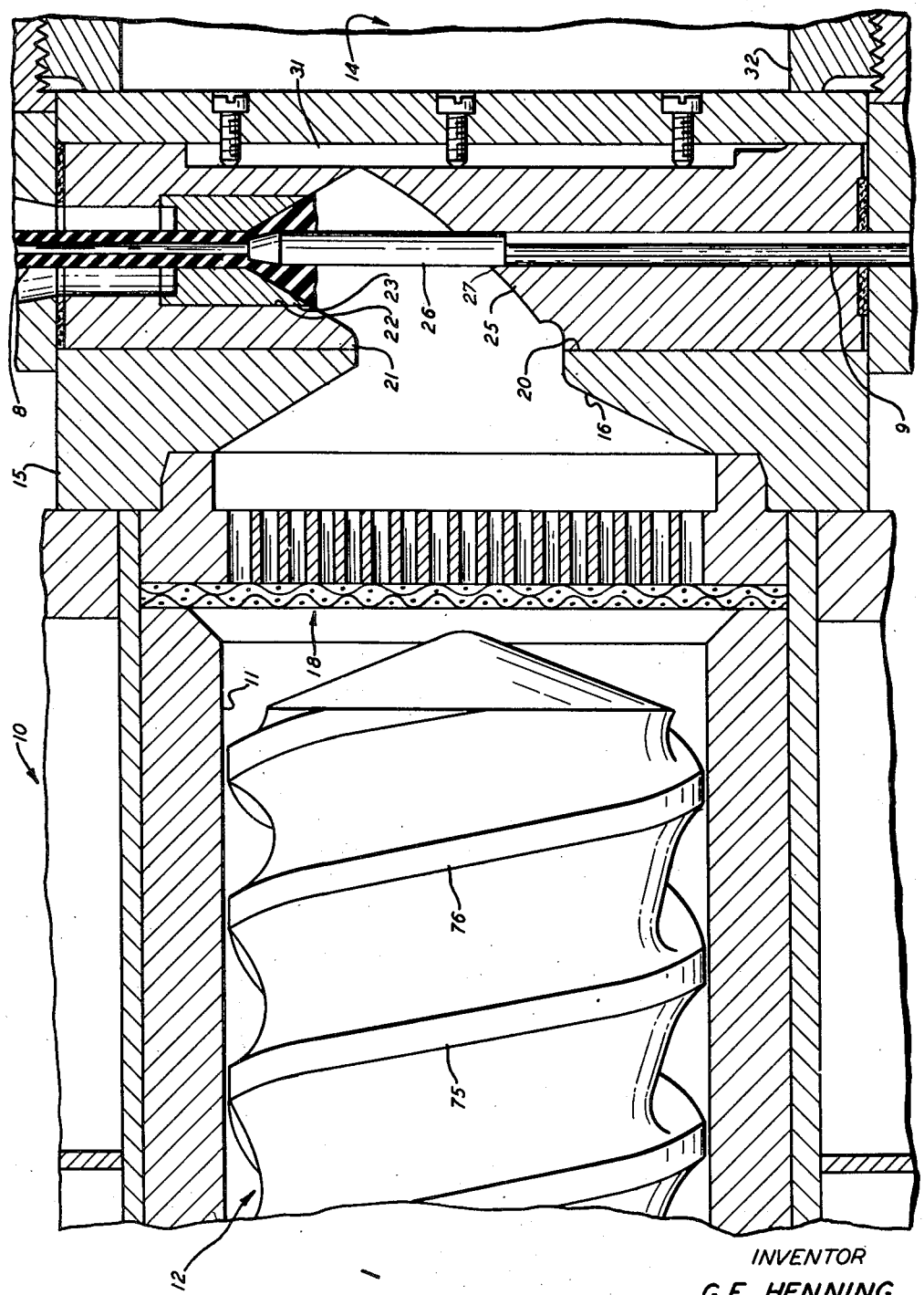
Fig. 1 is a fragmentary, horizontal section of an apparatus forming one embodiment of the invention.

Referring now in detail to the drawings, there is shown in Fig. 1 a continuous extrusion apparatus for forming a covering 8 from a non-metallic plastic material, such as a vulcanizable compound including rubber or a synthetic rubber-like material, or a thermoplastic material, around a filamentary conductor 9, which may be bare or may be covered with a textile or plastic covering. The extrusion apparatus includes a heated extrusion cylinder 10 having a cylindrical bore 11 formed therein in which a stock screw 12 is rotatably mounted. The stock screw is rotated by a shaft 13 (Fig. 2) to force the plastic material under high pressure through an extruding head 14 (Fig. 1). The extruding head 14 includes a body member 15 having a tapered opening 16, which forms a continuation of the bore 11 and communicates with a bore 20 formed in the extruding head transversely of the tapered opening 16. A strainer 18 is positioned between the bore 11 and the tapered opening 16 for straining oversized particles from the material. An annular die holder 21 positioned in the exit end of the bore 20 has a counterbore 22 formed therein in which is mounted a forming die 23.

The conductor 9 is advanced toward the right, as viewed in Fig. 1, by suitable conductor-advancing means, such as a capstan (not shown), through a core tube holder 25 and a core tube 26 extending from the core tube holder 25. The core tube holder is provided with an inclined concave surface 27 for deflecting the material toward the die 23. An aligning plate 31 maintains the die holder 21 and the core tube holder 25, and thereby the die 23 and the core tube 26, centered relative to each other in the bore 20, and a retaining nut 32 holds these elements in the extruding head 14.

The bore 11 (Fig. 2) in the extrusion cylinder 10 has a uniform diameter throughout its length and a smooth surface except for a portion intermediate of the ends thereof, which has a plurality of helical grooves 40—40 formed therein having helical ribs 41—41 therebetween. The cylinder is provided with an opening 43 into which the plastic material may be inserted into the bore 11. The stock screw 12 is provided with threads 45 and 46 for forcing the plastic material from the entrance end of the extrusion cylinder 10 toward the right, as viewed in Fig. 2. S-shaped blades 47 and 48 extend from the threads 45 and 46, respectively. The threads 45 and 46 have a relatively short pitch and gradually diminish in pitch from left to right, as viewed in Fig. 2, to the blades 47 and 48, which have very long pitches. The blades 47 and 48 are provided with convex faces 49 and 50 (Fig. 4), which are the leading faces of these blades as the stock screw is rotated in a clockwise direction, as viewed in Fig. 6, by the shaft 13. Wide edges 51 and 52 of the blades 47 and 48, respectively, are spaced slightly from the wall of the bore 11 so that the plastic material may slip between the wall of the bore 11 and the edges 51 and 52 as the stock screw 12 is rotated.

Figure 2:
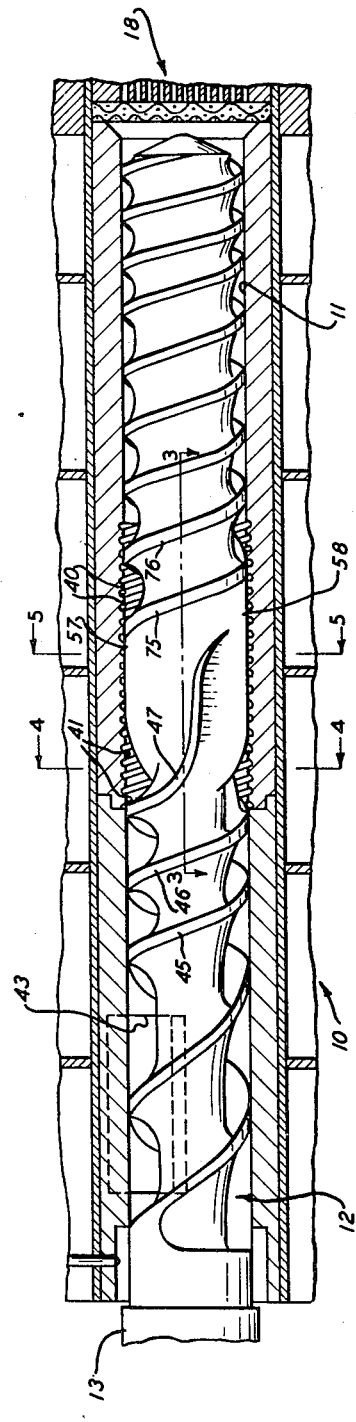
Fig. 2 is a reduced, fragmentary, vertical section of a portion of the apparatus.
Figure 3:
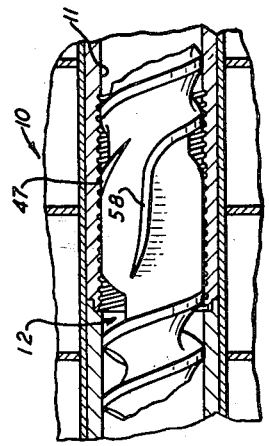
Fig. 3 is a fragmentary section taken along line 3—3 of Fig. 2.

S-shaped blades 57 and 58 similar to the blades 47 and 48 are spaced 90° from the blades 47 and 48, respectively, and are provided with convex faces 59 and 60 and wide edges 61 and 62 spaced slightly from the wall of the bore 11. The blades 47 and 48 parallel the blades 57 and 58 and are substantially coextensive therewith. As the stock screw 12 is rotated by the shaft 13, the plastic material is kneaded by the convex faces 49, 50, 59 and 60, and is rolled over these faces and over the wide, flat edges 51, 52, 61 and 62, which exert a milling or shearing action on the material, which thoroughly plasticizes the plastic material. Fillets 65, 66, 67 and 68 in the blades prevent the material from being wedged so tightly as to be stuck between the wall of the extrusion bore 11 and the convex faces of the blades. Due to their long pitch, the blades would not have much delivery capacity with a smooth surfaced bore. Hence, the helical grooves 40—40, which tend to advance the plastic material toward the right, as viewed in Fig. 2, are provided to give added delivery capacity. Also, the right ends of the blades have a relatively short pitch to force the material through the bore.

Figure 5:
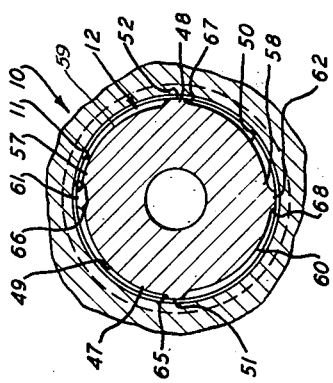
Fig. 5 is a fragmentary section taken along line 5—5 of Fig. 2.
Figure 4:
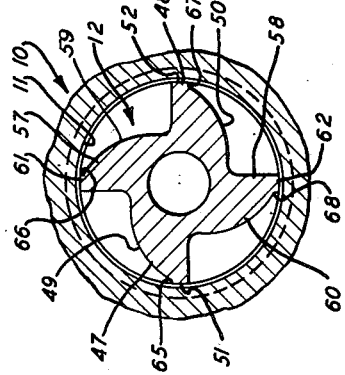
Fig. 4 is a fragmentary section taken along line 4—4 of Fig. 2.

The depth of the blades 47, 48, 57 and 58 decreases from a substantial depth at the left end of the blades, as viewed in Fig. 2 and shown in Fig. 4, to substantially zero at the right ends of the blades, as shown in Fig. 5, so that the plastic material is compressed greatly as it is forced through the portion of the extrusion bore 11 along which the blades extend, and all of the material is severely worked. Threads 75 and 76 extend from the blades 57 and 58 and decrease constantly in pitch from the left ends thereof to the right end of the screw 12, as viewed in Fig. 2. The threads 75 and 76 are shallower than the threads 45 and 46, but are deeper near their juncture with the blades 57 and 58 than the blades 47, 48, 57 and 58, which are very shallow at this juncture. The material is squirted under a high pressure at the right ends of the blades 47, 48, 57 and 58 into the spaces between the relatively deep threads 75 and 76 where the material is under a relatively low pressure. This forcing of the material from a high pressure area to a low pressure area works the material.

The delivery actions of the threads 45 and 46 and the blades 47, 48, 57 and 58 and the grooves 40—40 force the material through the portion of the bore 11 coextensive with the blades. The root of the stock screw becomes larger in diameter from left to right, as viewed in Fig. 2, in the bladed portion of the screw so that the material is progressively compressed as it is forced through the portion of the bore 11 coextensive therewith. The material empties from this portion into the much less restricted passages formed by the bore and the portion of the stock screw just beyond the juncture of the helical portions of the threads 75 and 76 and the blades 57 and 58. In so flowing the pressure on the material is lessened greatly so that the material is worked. That is, the material is forced seriatim through a relatively low pressure, unrestricted area, a relatively high pressure restricted area and a relatively low pressure, unrestricted area, which treatment works the material.

The constant decrease in pitch in the threads 75 and 76 toward the delivery ends thereof progressively increases the pressure on the material as it is forced along the bore 11 so that this portion of the stock screw tends to squirt the plastic material from the extrusion bore 11 as well as to advance it by the normal screw conveyor action and also works the material.

In the operation of the apparatus described hereinabove, the plastic material is fed into the left end of the extrusion bore 11, as viewed in Fig. 2. The shaft 13 rotates the stock screw 12 in a clockwise direction, as viewed in Fig. 4, and the threads 45 and 46 advance the plastic material toward the right, as viewed in Fig. 2, to the blades 47, 48, 57 and 58 and progressively increase the pressure on the material. The material is rolled up on the convex faces 49, 50, 59 and 60 of the blades and is kneaded thereby against the wall of the bore 11. The material slips between the flat edges of the blades and the wall of the bore 11, and is milled therebetween.

The helical grooves 40—40 in the cylinder 10 urge the material toward the right, as viewed in Fig. 2, when the material is revolved somewhat around the extrusion bore 11 with the blades 47, 48, 57 and 58. This urging of the material by the grooves 40—40 and the pressure on the material being worked by the blades from the pressure of the plastic material being forced to the right by the threads 45 and 46 force the plastic material through the bladed portion of the stock screw 12 from the deep portion of the blades to the shallow portions thereof, and thence into relatively deep spaces between the threads 75 and 76. The material then is advanced toward the right by the threads 75 and 76, and is forced through the strainer 18 and the extruding head 14 in which it is formed into the covering 8 over the conductor 9 (Fig. 1).

The above-described stock screw 12 serves to advance the plastic material along the extrusion cylinder and, with the wall of the bore 11, severely kneads and mills the material as the material is forced therealong. The kneading and milling of the material together with the squirting of the material through restricted areas into much less restricted areas plasticizes the material thoroughly so that it may be formed into a high quality covering on the conductor 9. Furthermore, the working action of the stock screw greatly reduces, and may in some cases eliminate heating and working operations prior to the introduction of the material into the apparatus.

What is claimed is:

1. An apparatus for advancing and working plastic material, which comprises an extrusion cylinder having a bore therein, a portion of said bore being provided with a plurality of helical flutes in the periphery thereof and an extrusion screw mounted in the extrusion bore in the extrusion cylinder, said extrusion screw having a threaded portion with a short pitch for forcing plastic material through the extrusion bore, said extrusion screw also being provided with a blade portion extending helically therealong substantially coextensive with the flutes in the periphery of the bore and having a long pitch for kneading the material, said blade portion extending helically in one direction and said flutes extending helically in the direction opposite to that in which the blade portions extend.

2. An extrusion apparatus for advancing and working plastic material in a hollow cylinder, which comprises a stock screw having at least one helical thread extending along a predetermined portion of the length thereof for advancing plastic material along the hollow cylinder, said stock screw also being provided with at least one blade extending along a portion of the stock screw other than the portion thereof along which the helical thread extends, said blade being provided with a convex face on one side thereof and also being provided with a relatively flat tip, and means for rotating the stock screw in a direction in which the convex face of the blade is the leading face thereof, whereby the convex face on the blade kneads the plastic material against the wall of the cylinder and the flat tip of the blade mills the plastic material against the wall of the cylinder.

3. An apparatus for advancing and working plastic material, which comprises an extrusion cylinder having therein a bore of a predetermined diameter, a portion of the length of said cylinder having internal grooves therein, an elongated member mounted rotatably in the bore and being provided with at least one thread for forcing plastic material along the bore, said thread extending along a predetermined portion of the member, said member also being provided with a kneading blade having a blunt tip and a sloping face, said blade being of a predetermined width such that there is clearance between the tip of the blade and the wall of the bore, and means for rotating the member in a direction in which the sloping face of the kneading blade is the leading face of the blade.

4. An apparatus for advancing and working plastic material, which comprises an extrusion cylinder having an elongated bore, and a stock screw extending substantially coextensive with the bore in the cylinder, said stock screw being provided with a threaded delivery portion, a bladed working portion and a threaded delivery portion extending therealong in the order stated, said threaded portions having threads having short pitches, said bladed working portion having a blade extending therealong substantially parallel to the longitudinal axis of the stock screw, said stock screw having a root portion, said root portion being relatively small along the delivery portions of the stock screw and tapering from a relatively small diameter to a relatively large diameter from one end of the blade to the other end thereof.

GEORGE E. HENNING.

REFERENCES CITED

The following references are of record in the file of this patent:

UNITED STATES PATENTS

| Number | Name | Date |
|---|---|---|
| 591,575 | Smith | Oct. 12, 1897 |
| 837,010 | Vernstein | Nov. 27, 1906 |
| 1,403,681 | Gordon | Jan. 17, 1922 |
| 1,762,368 | Vandergrift | June 10, 1930 |
| 1,935,050 | Gordon | Nov. 14, 1933 |
| 2,119,162 | Hartner | May 31, 1938 |
| 2,319,859 | Hale | May 25, 1943 |
| 2,367,394 | Griffiths | Jan. 16, 1945 |
| 2,370,469 | Johnston et al. | Feb. 27, 1945 |
| 2,370,952 | Gordon | Mar. 6, 1945 |
| 2,407,503 | Magerkurth et al. | Sept. 10, 1946 |